United States Patent [19]

Chiu et al.

[11] 4,229,489

[45] Oct. 21, 1980

[54] COLD-WATER DISPERSIBLE, GELLING STARCH

[75] Inventors: Chung W. Chiu, Princeton; Morton W. Rutenberg, North Plainfield, both of N.J.

[73] Assignee: National Starch and Chemical Corporation, Bridgewater, N.J.

[21] Appl. No.: 43,040

[22] Filed: May 29, 1979

[51] Int. Cl.$^2$ ............................................. A23L 1/195
[52] U.S. Cl. ................................. 426/578; 426/661; 536/106; 127/33
[58] Field of Search .................... 426/578, 661, 658; 536/106; 260/233.3; 127/33, 70

[56] References Cited

U.S. PATENT DOCUMENTS

| | | | |
|---|---|---|---|
| 2,328,537 | 9/1943 | Felton | 127/33 |
| 2,438,855 | 3/1948 | Kerr | 426/578 |
| 2,754,232 | 7/1956 | Wetzstein | 127/33 |
| 2,801,242 | 7/1957 | Kerr | 260/233.3 |
| 2,935,510 | 5/1960 | Wurzburg | 426/578 |
| 3,021,222 | 2/1962 | Kerr | 426/661 |
| 3,437,493 | 4/1969 | Robinson | 426/661 |
| 3,583,874 | 6/1971 | Germino | 426/578 |
| 3,857,976 | 12/1974 | Szymanshi et al. | 426/578 |
| 4,120,982 | 10/1978 | Eastman | 536/106 |
| 4,120,983 | 10/1978 | Valle | 536/106 |

*Primary Examiner*—Jeanette M. Hunter
*Attorney, Agent, or Firm*—Edwin Szala; Janet E. Hasak

[57] ABSTRACT

A cold-water dispersible, modified starch characterized by forming a gel having a Bloom strength of at least 50 grams is prepared by reacting a tapioca starch with a crosslinking agent to within defined Brabender viscosity limits; converting the crosslinked starch in a sufficient amount to provide the modified starch with gelling properties; and drum-drying the crosslinked and converted starch to obtain the modified starch product. The gelling instant starch thus prepared is particularly useful in food systems of the type which gel upon standing, such as pie filling, jellies, and puddings.

9 Claims, No Drawings

COLD-WATER DISPERSIBLE, GELLING STARCH

BACKGROUND OF THE INVENTION

I. Field of the Invention

The present invention relates to a cold-water dispersible, modified starch characterized by its gelling properties, and a process for its preparation. This invention also relates to food systems containing such a starch.

II. Description of the Prior Art

It is often desirable to prepare food systems which have a set or gel texture, such as pie fillings, puddings and jellies. Many types of food systems of this description contain gelling agents and must be cooked to effect gelation. Common gelling agents used in the past for this purpose are agar, gelatin, corn starch, pectin, carrageenin, algin, and combinations of locust-bean gum and xanthan gum. In addition, starches derived from, e.g., corn, potato, tapioca, and wheat which are acid-converted to a certain water fluidity level will retrograde to a gel when cooked.

An example of a food product which requires cooking to effect gelation is the conventional starch-based pudding, which generally consists of an ungelatinized starch, flavorings, sweetening agents, etc. Such puddings are prepared for consumption by adding milk, cooking until the starch is gelatinized, pouring the cooked mixture into a bowl or individual serving dishes, and cooling and/or refrigerating.

There are, however, certain disadvantages associated with food systems of this type. In addition to the fact that cooking of the food system is necessary to impart the gel mixture thereto, many of the gelling agents used in these systems require specific conditions. Thus, for example, gelatin can be used only after dissolution in very hot water, and typical pectins for use in jellies require about 65% sugar solids to produce a gel.

The remaining types of known food systems which have a set or gel texture form a gel without cooking. Most of these products are milk-based and consist of pregelatinized (i.e., cold-water dispersible) starch, one or more setting agents, which are usually phosphate salts (e.g., tetrasodium pyrophosphate), and flavoring, sweetening, and coloring agents. The set or gel properties of these food systems are obtained from the interaction of the phosphate salts with the casein and calcium ion provided by the milk, and not with the starch ingredient in the formulation. The pregelatinized starch functions as a viscosity builder or thickening agent, but is not the prime factor in the developement of the gel structure of the prepared food system.

The major drawback of these uncooked, so-called "instant", food formulations is that they do not have the firm gel structure of the cooked formulations, i.e., they do not cut as cleanly with a spoon; and their texture, rather than being smooth, is generally described as "grainy" in both appearance and "mouth-feel" characteristics. Moreover, the setting salts are not operative at low pH or in non-milk-based food systems.

U.S. Pat. No. 3,583,874 discloses a starch composition suitable as gelling agent in instant puddings, which comprises a blend of a pregelatinized, defatted starch and a granular, preswollen starch having a water fluidity in a certain range.

A cold-water dispersible, modified tapioca starch which forms a gel when dispersed in cold water is taught in U.S. Application Ser. No. 1,720 filed Jan. 8, 1979 to Chung Wai Chiu et al. This starch product is obtained by drum-drying a tapioca starch which has been converted to a specified water fluidity and reacted with a crosslinking agent to give Brabender viscosity parameters within a selected range. It is taught therein that if the starch is simply crosslinked and drum dried without having been converted to a fluidity starch, a product having gelling properties is not obtained.

Accordingly, it is an object of the present invention to provide a different process for preparing a cold-water dispersible, modified tapioca starch as one component which forms a gel when dispersed in cold water.

It is another object to provide a food system e.g., a pie filling or jelly formulation, containing a cold-water dispersible gelling starch.

SUMMARY OF THE INVENTION

The above and related objects are achieved by a cold-water dispersible, modified tapioca starch with gelling properties, prepared by drum-drying a tapioca starch which has been reacted with a crosslinking agent such that the crosslinked starch has a peak Brabender viscosity of from about 250 to about 850 B.U. and reaches peak viscosity from 50° C. in about 22 to 65 minutes, the crosslinked starch being thereafter converted such that the crosslinked, converted starch has a Brabender Viscosity Differential, measured between 80° and 95° C., of from about −40 to about +55% and has a minimum Brabender viscosity at 80° C. of about 100 B.U., said starch after drum drying being capable of forming a gel having a Bloom strength of at least 50 grams.

The product obtained by this process is comparable in properties to the tapioca starch product obtained by U.S. application Ser. No. 1,720 mentioned above which employs the reverse process. Thus, the product herein forms a gel at low as well as at high pH without the need for setting salts, is effective as a gelling agent in a non-milk-based food system, and is capable of forming a gel with or without the addition of sugar thereto.

The present modified starch is useful in any food formulations where a starch which will gel without further cooking is desired, and is particularly suited for use in pie and cream fillings, puddings, spreads, jellies, and instant mixes of the type which are reconstituted with water or milk and allowed to set at room temperature or lower. A food system containing such a starch will have properties, e.g., texture, appearance, gel structure, and flavor, which closely resemble those of a food formulation which is cooked.

DESCRIPTION OF THE PREFERRED EMBODIMENTS

In the preparation of the present modified starch, native tapioca starch in its intact granular form is reacted with any crosslinking agent capable of forming linkages between the starch molecules. Typical crosslinking agents suitable herein are those approved for use in foods such as epichlorohydrin, linear dicarboxylic acid anhydrides, acrolein, phosphorus oxychloride, and soluble metaphosphates; however, other known crosslinking agents such as formaldehyde, cyanuric chloride, diisocyanates, divinyl sulfone, and the like may also be used if the product is not to be used in foods. Preferred crosslinking agents are phosphorus oxychloride, epichlorohydrin, sodium trimetaphosphate (STMP), and adipic-acetic anhydride (1:4), and most preferably phosphorus oxychloride.

The crosslinking reaction itself is carried out according to standard procedures described in the literature for preparing crosslinked, granular starches such as that of, e.g., U.S. Pat. Nos. 2,328,537 and 2,801,242. The exact reaction conditions employed will, of course, vary with the type of crosslinking agent used, as well as the type of starch base, the reaction scale, etc. The reaction between starch and crosslinking agent may be carried out in aqueous medium, which is preferred, in which case the starch is slurried in water and adjusted to the proper pH, and the crosslinking agent added thereto.

The crosslinking reaction may be carried out at a temperature of 5°–60° C., and preferably 20°–40° C. It will be recognized that use of temperatures above about 60° C. will be undesirable for this purpose, since granule swelling and filtration difficulties or gelatinization of the starch may result therefrom; and the starch must retain its granular form until it is drum-dried. Reaction time will vary depending mainly on the crosslinking agent and temperature used, but is typically about 0.2–24 hours.

After the crosslinking reaction is complete, the pH of the reaction mixture is generally adjusted to 5.5–6.5, using a common acid. The granular reaction product may be recovered by filtration and washed with water and dried prior to conversion. However, such a washing step is not necessary for purposes herein, and the crosslinked product may be converted directly without isolation thereof.

The amount of crosslinking agent necessary to give a product having the characteristics defined herein will vary depending, for example, on the type of crosslinking agent employed, the concentration of the crosslinking agent, the reaction conditions, the extent of conversion, the type of drum drying employed, and the necessity for having a crosslinked starch which falls within a specified range of crosslinking as determined by its viscosity characteristics. It will be recognized by the practitioner that it is not the amount of crosslinking agent which is added to the reaction vessel that determines the properties of the final product, but rather the amount of reagent which actually reacts with the starch, as measured by the Brabender viscosities. As an approximate guideline, the amount of phosphorus oxychloride used for reaction generally will vary from about 0.005 to about 0.05% by weight on starch, depending on the desired degree of conversion of the starch and the type of drum drier; other crosslinking agents may be employed in different amounts.

Brabender viscosities of the crosslinked starch before conversion are best measured herein by the peak viscosity attained by the starch when it is heated in a pH 3 buffer solution to a maximum temperature of 95° C. in a viscometer. The peak viscosity of the crosslinked starches which are applicable herein may range from about 250 to about 850 B.U., depending on the factors mentioned above. The amount of crosslinking is not only determined by peak viscosity; a more important parameter in defining the crosslinked starch intermediates is the time required for a slurry of the starch to reach peak viscosity, starting at 50° C. Thus, from the time the starch slurry is at 50° C. the starch should reach peak viscosity in about 22 to 65 minutes. Preferred ranges will vary according to such factors as, for example, the type of crosslinking agent. The practitioner will recognize which levels of crosslinking yield the best results for any particular application.

After crosslinking, but before the drum-drying step, the starch is converted to its fluidity or thin-boiling form using a suitable method of degradation which results in the modified starch defined herein, such as mild acid hydrolysis with an acid (e.g., sulfuric or hydrochloric acid), conversion with hydrogen peroxide or enzyme conversion, etc. In a preferred embodiment, the starch is converted via acid hydrolysis.

The extent of conversion on the crosslinked starch is best expressed in terms of a parameter defined below, called the Brabender Viscosity Differential (BVD) for purposes herein:

$$\frac{V_{95} - V_{80}}{V_{80}} \times 100$$

wherein $V_{95}$ and $V_{80}$ are the Brabender viscosities of the starch at 95° and 80° C., respectively. The BVD is measured using an unbuffered solution in a procedure described hereinbelow. The BVD, which is expressed in percentage units, may be a positive or negative value, depending on whether the Brabender viscosity increases or decreases, respectively, as the temperature is raised. The Brabender Viscosity Differential of the crosslinked and converted starch may vary broadly from about −40 to +55%, measured at 7% solids, using a 350 cm.-g. cartridge. If the BVD is outside this range, a product giving a set or stable texture will be obtained, with no gel formation. It will be understood by the practitioner that not all of the values with the above-mentioned BVD ranges will be operable for crosslinked starches having the degree of crosslinking defined herein. The appropriate BVD must be determined separately for each crosslinking level and for the drum-drier employed, as will be described hereinbelow.

In order that the gelling instant starch herein will be obtained, not only must the BVD of the crosslinked and converted starch be within a narrowly defined range, but also the Brabender viscosity of this starch as measured at 80° C. must have a certain minimum value, i.e., it must be at least about 100 B.U. when measured at 7% solids using a 350 cm.-g. cartridge. It will be recognized that this specified minimum value is an absolute minimum, and that it may need to be higher than 100 B.U., depending on the level of crosslinking in the starch.

To be strictly accurate, the optimal BVD and minimum Brabender viscosity at 80° C. should be determined for each starch at a given peak viscosity crosslinking level and for the particular drum drier to be employed. When the laboratory single-drum drier described hereinafter and employed in most of the examples is used, a general relationship between peak viscosities (of the crosslinked starch) and viscosities of the crosslinked and converted starch, based on experimental results, can be expressed as follows:

| Peak Viscosity Range[a] (B.U.) (Crosslinked Starch) | Brabender Viscosity Differential (BVD) Range (%)[b] | Minimum Brabender Viscosity at 80° C. (B.U.)[b] |
| --- | --- | --- |
| 250–400 | 0 to +30 | 100 |
| 401–530 | −20 to +40 | 130 |
| 531–650 | −25 to +55 | 130 |
| 651–750 | −35 to −20 | 150 |

-continued

| Peak Viscosity Range[a] (B.U.) (Crosslinked Starch) | Brabender Viscosity Differential (BVD) Range (%)[b] | Minimum Brabender Viscosity at 80° C. (B.U.)[b] |
|---|---|---|
| 751–850 | −40 to −35 | 250 |

[a]Viscosity based on 350 cm.-g. cartridge using buffered Brabender procedure (indicated below as Procedure A1).
[b]Viscosity based on 350 cm.-g. cartridge using unbuffered Brabender procedure (indicated below as Procedure A2).

The above table may serve as a guideline for obtaining starches with gelling properties; however, BVD numbers slightly higher or lower than those specified may still give an acceptable gel within a particular peak viscosity range. It is noted that the above guidelines were obtained based on data from the laboratory single-drum drier, and are not necessarily applicable to drum driers of a different type (e.g., having higher shear). Thus, for example, when a commercial drum drier is employed, different relationships among peak viscosity, BVD and minimum viscosity at 80° C. may be observed. The practitioner is reminded that the actual numbers specified vary in a sensitive way with the crosslinking agent and drum drier used, the method of conversion etc.; and that the most important criterion in defining the starch product herein is that it have the gelling properties specified hereinbelow.

The crosslinked and converted starch obtained by the steps outlined above must be pregelatinized to become dispersible in cold water. The pregelatinization is accomplished herein by using a suitable drum drier, having a single drum or double drums, to dry the starch to a moisture level of about 12% or less. The starch slurry is typically fed onto the drum or drums through a perforated pipe or oscillating arm from a tank or vat provided with an agitator and a rotor.

The crosslinking levels, BVD and minimum viscosity ranges specified above are interdependent, but they also vary to some degree with the drum drier employed. It has been found that drum driers which produce higher shear than a laboratory single-drum drier (such as a commercial single-drum drier) require that the starch have a higher level of crosslinking to obtain the present modified starch with its gelling properties. Without limitation to any one theory, it is postulated that the unique gelling properties of the products herein are related to the release of amylose during drum drying. The combined treatment of crosslinking and conversion appears to control the amount and rate of amylose release on the drum drier, with the conversion step also possibly altering the size of the amylose. Drum driers with higher shear possibly tend to disrupt the granules to a greater extent, liberating more amylose at a faster rate, which amylose then retrogrades on the drum. If, however, the starch is more highly crosslinked, it will resist this disruption and can be successfully drum-dried using higher-shear apparatus without an adverse effect on its gelling properties.

After drying, the starch product is removed from the drum drier in sheet form and then pulverized to a powder. Alternatively, the product may be reduced to flake form, depending on the particular end-use, although the powdered form is preferred. Any conventional equipment such as a Fitz mill or hammer mill may be used to effect suitable flaking or pulverizing.

The final product obtained from the drum-drying operation is a cold-water dispersible starch which forms a gel when dispersed in water. The determination of gel formation and the measurement of gel strength are accomplished by subjective evaluation and by Bloom Gelometer readings. These two methods of measurement are not always consistent (due in part to the cohesiveness of some of the products), but for purposes herein, the present modified starch must form a gel having a Bloom strength (as defined herein) of at least 50 grams, and preferably at least 90 grams.

In the examples which follow, all parts and percentages are given by weight and all temperatures in degrees Centigrade unless otherwise indicated.

The following analytical and testing procedures are used in the examples to characterize the starch products herein.

A. Brabender Determination

1. Peak Viscosity of Crosslinked Starch (Buffered Brabender Procedure):

The crosslinked starch to be tested is slurried in distilled water to give 410 g. of slurry containing 22.88 g. of anhydrous starch solids. To this slurry is added 50 g. of a buffered solution prepared as follows: Solution 1 is prepared by dissolving 210.2 g. citric acid monohydrate in distilled water and diluting to 1000 ml. in a volumetric flask. Solution 2 is prepared by dissolving 98.0 g. trisodium citrate dihydrate in distilled water and diluting to 1000 ml. The buffer solution added to the slurry is prepared by mixing 1.5 volumes of Solution 1 with 1.0 volumes of Solution 2. The final pH of the buffered starch slurry will be 3.0±0.1. The slurry is poured into a Brabender cup and the viscosity measured using a VISCO/Amylo/GRAPH (manufactured by C. W. Brabender Instruments, Inc., Hackensack, N.J.). The starch slurry is rapidly heated to 50° C. and then heated further from 50° to 95° C. at a heating rate of 1.5° C. per minute. Viscosity readings are taken when the slurry first reaches 95° C., then at peak viscosity, and finally at ten minutes after peak viscosity is attained. A 350 cm.-g. cartridge is used for all viscosity measurements. The time elapsed between when the slurry first reaches 50° C. and when it reaches peak viscosity is also recorded. The viscosities are expressed in Brabender Units.

2. Viscosity at 80° C. and 95° C. of Crosslinked and Converted Starch (Unbuffered Brabender Procedure):

The crosslinked and converted starch to be tested is slurried in a sufficient amount of distilled water to give 500 g. of slurry containing 35.4 g. of anhydrous starch solids. The slurry is then poured into the Brabender cup, and the viscosity is measured using a VISCO/Amylo/GRAPH, with the slurry heated from 50° C. to 95° C. as described above. Viscosity readings are recorded at 80° C. and at 95° C. in Brabender Units using a 350 cm.-g. cartridge at 7% solids.

B. Gelling Evaluation

A total of 7.0 g. of starch sample (the crosslinked and converted starch after drum drying) and 20.0 g. of sugar are dry-mixed by shaking in a 4-oz. (118-ml.) jar. This dry mixture is added slowly to 100 ml. distilled water while mixing in a Sunbeam Mixmaster (trademark) Kitchen Mixer at speed #2 for a period of one minute. The resulting mixture is then poured into a 4-oz. (118-ml.) jar and placed in a refrigerator (at 15° C.) for about 16 hours. After this period, the mixture is removed from the refrigerator and allowed to stand at room temperature for about 0.5 hours. The sample is evaluated for Bloom strength using a Bloom Gelometer (Precision Scientific Co., Chicago, IL) with a 1-in. (2.54-cm.)- diameter plunger. The gel is additionally evaluated by hand by inverting the jar and removing the sample, noting whether the form is retained. The sample is judged by degrees as being stable (fluid), a set (retains its form as lumps, but when stirred, becomes fluid), weak gel (retains more of its form), or strong gel (retains complete form and cuts cleanly). The relationship between Bloom strength and hand evaluation is not always consistent, but as somewhat of a guideline, the following approximate correlation can be made:

| Bloom Strength (g.) | Description of Gel |
|---|---|
| 90 or more | strong gel |
| 80–90 | medium to strong gel |
| 65–80 | medium gel |
| 60–65 | weak gel |
| 50–60 | set |

EXAMPLE I

This example illustrates the preparation of the cross-linked starches in the first step of the process herein.

Starch Sample Nos. 1–10 in Table I were prepared as follows:

A total of 1000 g. of raw tapioca starch was slurried in 1250 ml. of distilled water containing 5.0 g. sodium chloride and 6.0 g. sodium hydroxide. Reagent-grade phosphorus oxychloride was then added with stirring in the given amounts and the mixture was allowed to react at room temperature (24° C.) for two hours. The mixture was thereafter neutralized with dilute hydrochloric acid to pH 5.5–6.0, filtered, washed and dried. Each starch sample was evaluated for peak viscosity, and the results are indicated in Table I.

TABLE I

| Starch Sample No. | $POCl_3$ (% on starch as is) | Peak Viscosity[a] (B.U.) | Time to Peak Viscosity from 50° C. (min.)[a] |
|---|---|---|---|
| 1 | 0.005 | 820 | 22.0 |
| 2 | 0.010 | 780 | 24.5 |
| 3 | 0.015 | 590 | 32.0 |
| 4 | 0.020 | 510 | 38.0 |
| 5 | 0.025 | 480 | 38.5 |
| 6 | 0.030 | 485 | 43.5 |
| 7 | 0.035 | 445 | 50.0 |
| 8 | 0.040 | 430 | 54.5 |
| 9 | 0.050 | 300 | 65.0 |
| 10 | 0.100 | 210 | 140.0 |

[a]Using Brabender Procedure A1.

EXAMPLE II

This example illustrates the preparation of the gelling instant starches herein.

Starch Sample Nos. 11–42 in Table II were prepared as follows: Starch Sample Nos. 1–4, 6, and 8–10 were placed in a water bath at 50° C. to which was added 1.75% concentrated hydrochloric acid (36.5–38.0% HCl) on starch as is. Samples were removed from the bath after the indicated amount of hours of hydrolysis and then were neutralized with dilute sodium hydroxide to pH 5.5–6.0, filtered, washed and dried. The unbuffered Brabender viscosity values of the samples were measured, and the data are indicated in Table II.

TABLE II

| Starch Sample No. | Hydrolysis at 50° C. (hours) | Brabender Viscosity[a] (B.U.) 80° C. | 95° C. | BVD (%) | Gel Evaluations Bloom Strength (g.) | Hand Evaluation |
|---|---|---|---|---|---|---|
| 1[b] | 0 | 2040 | 2030 | −0.5 | —[c] | stable |
| 11 | 3 | 680 | 445 | −34.6 | —[c] | set |
| 12 | 5 | 340 | 210 | −38.2 | —[c] | set to weak gel |
| 13[b] | 7 | 145 | 80 | −44.8 | —[c] | set |
| 2[b] | 0 | 1360 | 2130 | +56.6 | —[c] | stable |
| 14 | 3 | 860 | 760 | −11.6 | 65 | set |
| 15 | 5 | 430 | 300 | −30.2 | 67 | weak gel |
| 16 | 7 | 200 | 130 | −35.0 | 63 | weak to medium gel |
| 17 | 8 | 190 | 130 | −31.6 | 50 | set to weak gel |
| 18[b] | 9 | 135 | 80 | −40.7 | 45 | set |
| 3[b] | 0 | 520 | 770 | +48.1 | —[c] | stable |
| 19 | 0.5 | 600 | 910 | +51.6 | 87 | weak to medium gel |
| 20 | 1.5 | 1240 | 1290 | +4.0 | 124 | strong gel |
| 21 | 5.0 | 530 | 440 | −17.0 | 99 | strong gel |
| 22 | 7.0 | 280 | 220 | −21.4 | 71 | strong gel |
| 23 | 8.0 | 140 | 110 | −21.4 | 84 | weak gel |
| 4[b] | 0 | 130 | 190 | +46.1 | —[c] | stable |
| 24[b] | 0.5 | 350 | 560 | +60.0 | 57 | set |
| 25 | 1.5 | 720 | 880 | +22.2 | 94 | medium gel |
| 26 | 5.0 | 520 | 480 | −7.7 | 97 | strong gel |
| 27 | 7.0 | 290 | 260 | −10.3 | 104 | strong gel |
| 28 | 8.0 | 150 | 130 | −13.3 | 64 | weak to medium gel |
| 6[b] | 0 | 20 | 25 | +25.0 | —[c] | stable |
| 29[b] | 1.5 | 240 | 380 | +58.3 | 57 | set |
| 30 | 2.5 | 455 | 590 | +30.0 | 84 | weak gel |
| 31 | 7.0 | 330 | 330 | −3.0 | 112 | strong gel |
| 32 | 8.0 | 130 | 120 | −7.7 | 83 | medium gel |
| 8[b] | 0 | —[c] | —[c] | —[c] | —[c] | —[c] |
| 33[b] | 2 | 80 | 135 | +68.7 | 45 | stable |
| 34 | 3 | 170 | 220 | +29.4 | 67 | set to weak gel |
| 35 | 5 | 280 | 330 | +17.8 | 115 | strong gel |
| 36 | 8 | 150 | 150 | 0 | 91 | medium gel |
| 9[b] | 0 | 0 | 0 | 0 | —[c] | —[c] |
| 37 | 2 | 75 | 110 | +46.6 | 50 | stable to set |
| 38 | 4 | 150 | 195 | +30.0 | 84 | set to weak gel |
| 39 | 8 | 100 | 120 | +20.0 | 67 | weak gel |
| 10[b] | 0 | —[c] | —[c] | —[c] | —[c] | —[c] |
| 40[b] | 2 | —[c] | —[c] | —[c] | —[c] | stable |
| 41[b] | 6 | 20 | 20 | 0 | —[c] | stable |

TABLE II-continued

| Starch Sample No. | Hydrolysis at 50° C. (hours) | Brabender Viscosity[a] (B.U.) 80° C. | 95° C. | BVD (%) | Gel Evaluations Bloom Strength (g.) | Hand Evaluation |
|---|---|---|---|---|---|---|
| 42[b] | 24 | 10 | 10 | 0 | —[c] | stable |

[a]Measured using a 350 cm.-g. cartridge at 7% solids in Brabender Procedure A2.
[b]These examples are outside the scope of the invention and are included only for comparison purposes.
[c]Not measurable.

Each sample was then drum-dried by slurrying 200 g. starch in 300 ml. water and drying the slurry on a steam-heated steel drum, with steam pressure of 105–110 psi. (7.4–7.7 kg./cm.$^2$), having the following specifications

|  | Speed (RPM) | Length in. (cm.) | Temperature °F. (°C.) | Diameter in. (cm.) |
|---|---|---|---|---|
| Feed Roller | 52.86 | 10 (25.4) | — | 2 (5.1) |
| Drum | 5.08 | 10 (25.4) | 287–293 (142–145) | 10 (25.4) |

The pregelatinized starch sheets thus obtained were then pulverized using a laboratory pulverizng mill (#008 screen), manufactured by Weber Brother Metal Works, Chicago, IL.

The dried starch products were evaluated as to their gelling properties by the Bloom strength and hand-evaluation tests above described. The results, given in Table II, indicate that no gels are obtained when the starch is crosslinked without being hydrolyzed, or when the starch is crosslinked such that it is outside the specified viscosity and BVD range. Some inconsistencies in the hand and Bloom gel strength tests occur, but, in general, as the Bloom strength value increases, a stronger gel is observed.

EXAMPLE III

This example illustrates the use of different crosslinking agents to prepare the modified starch herein.

A. Sodium Trimetaphosphate (STMP): (Starch Sample Nos. 43–51)

A total of 1000 g. of raw tapioca starch was slurried in 1250 ml. water containing 10 g. sodium chloride and 6 g. sodium hydroxide. STMP was then added in the amounts indicated in Table III. After stirring for 16 hours at room temperature, the mixture was neutralized with dilute hydrochloric acid (prepared by mixing one part of 10% HCl with three parts of water) to pH 5.5–6.5. Then, all but samples 43, 46 and 49 were placed in a water bath at 50° C. containing hydrochloric acid and hydrolyzed as described in Example II for 3 and 5 hours, and thereafter recovered as described previously.

B. Epichlorohydrin: (Sample Nos. 52–54)

A total of 1000 g. of raw tapioca starch was slurried in 1250 ml. water containing 6 g. sodium hydroxide. The epichlorohydrin was added in the amount given in Table III as a 1% aqueous solution and allowed to react in a jar by tumbling. After 16 hours, the mixture was neutralized and the starch was hydrolyzed and isolated as described above.

C. Adipic-Acetic Mixed Anhydride: (Sample Nos. 55–57)

A total of 1000 g. of raw tapioca starch was slurried in 1250 ml. water and the pH was adjusted to 8 with 3% sodium hydroxide solution. Then, mixed anhydride (prepared by gradually heating a mixture of one part adipic acid and four parts acetic anhydride to 90° C. over a period of one hour and holding at 90° C. for one hour) was added slowly in the amounts indicated in Table III, with the pH controlled at 8 with 3% sodium hydroxide solution. After completion of addition, the mixture was allowed to stir for an additional 15 minutes and then neutralized. Hydrolysis was carried out as above except at a temperature of 45° C.

Each of the crosslinked and converted products prepared as above was evaluated for Brabender viscosity, drum-dried, and measured for gel properties as previously described. The results are given in Table III. It can be seen from the data that crosslinking agents other than phosphorus oxychloride may be used to obtain gels within the limits prescribed herein.

TABLE III

| Starch Sample No. | Amount of STMP (% by weight on starch as is) | Amount of Epichlorohydrin (% by weight on starch as is) | Amount of Adipic-Acetic Anhydride (% by weight on starch as is) | Hydrolysis (hours) | Brabender Viscosity (B.U.) 80° C. | 95° C. | BVD (%) | Gel Evaluations Bloom Strength (g.) | Hand Evaluation |
|---|---|---|---|---|---|---|---|---|---|
| 43[a] | 0.015 | — | — | 0 | 2000 | 2150 | +7.5 | —[b] | stable |
| 44 | " | — | — | 3 | 1100 | 1000 | −0.9 | 103 | medium gel |
| 45 | " | — | — | 5 | 635 | 520 | −18.1 | 76 | medium gel |
| 46[a] | 0.025 | — | — | 0 | 980 | 1300 | +32.6 | —[b] | stable |
| 47 | " | — | — | 3 | 1180 | 1140 | −3.4 | 95 | strong gel |
| 48 | " | — | — | 5 | 710 | 650 | −8.4 | 98 | strong gel |
| 49[a] | 0.035 | — | — | 0 | 400 | 570 | +42.5 | —[b] | stable |
| 50 | " | — | — | 3 | 1020 | 1050 | +2.9 | 104 | strong gel |
| 51 | " | — | — | 5 | 675 | 660 | −2.2 | 125 | strong gel |
| 52[a] | — | 0.075 | — | 0 | 575 | 760 | +32.2 | —[b] | stable |
| 53 | — | " | — | 3 | 800 | 750 | −6.3 | 105 | strong gel |
| 54 | — | " | — | 5 | 430 | 350 | −18.6 | 85 | strong gel |
| 55[a] | — | — | 0.35 | 0 | 2590 | 2810 | +8.5 | —[b] | stable |
| 56 | — | — | " | 3 | 1720 | 1610 | −6.4 | 92 | strong gel |
| 57 | — | — | " | 5 | 900 | 750 | −16.7 | 89 | strong gel |

[a]These examples are outside the scope of the invention and are included only for comparison purposes.
[b]Blom strength is not measurable.

EXAMPLE IV

This example illustrates the effect of a different drum drier on gel formation of the starch herein.

Starch samples Nos. 58–60 in Table IV were prepared as described in Example II using as the starch base a tapioca starch crosslinked with 0.033% phosphorus oxychloride with a peak viscosity of 425 B.U. and a time to peak from 50° C. of 52 min. The time for hydrolysis of each sample is given in the table. The Brabender viscosities of each sample were measured, and then the samples were dried on a laboratory double-drum drier with the given specifications.[b] Each starch was evaluated for gel strength, with the results summarized in Table IV.

TABLE IV

| Starch Sample Nos. | Hydrolysis at 50° C. (Hours) | Brabender Viscosity (B.U.)[a] 80° C. | 95° C. | BVD (%) | Gel Evaluations Bloom Strength | Hand Evaluation |
|---|---|---|---|---|---|---|
| 58 | 6.25 | 410 | 460 | +12 | 91 g. | strong gel |
| 59 | 7.00 | 475 | 525 | +11 | 81 g. | medium gel |
| 60 | 8.25 | 455 | 460 | −1 | 92 g. | strong gel |

| Speed (RPM) | Length ft. (mm.) | Temperature °F. (°C.) | Diameter ft. (cm.) | Steam Pressure psi (kg./cm.$^2$) |
|---|---|---|---|---|
| 5 | 1.5 (46) | 295–310 (146–154) | 1 (31) | 95 (6.7) |

[a] Measured using a 350 cm.-g. cartridge at 7% solids.
[b] Description of Drum Drier Employed:

EXAMPLE V

This example illustrates the preparation of a lemon pie filling containing the present gelling instant starch.

The following ingredients were employed in the indicated amounts:

| | |
|---|---|
| Starch Sample No. 31 | 6.000% |
| Lemon Crystals #7 | 0.700% |
| Water | 64.445% |
| Sugar | 26.000% |
| Liquid Non-Dairy Creamer | 2.000% |
| Egg Yolk Solids | 0.700% |
| Adipic Acid | 0.150% |
| F.D. & C Yellow #5 | 0.005% |
| | 100.000% |

All dry ingredients were first blended thoroughly. The water and non-dairy creamer were placed in the mixing bowl of a Mixmaster mixer, and the dry mix was added to the liquid while mixing at a low speed (#2) until smooth. The filling thus obtained was placed in a baked pie crust and refrigerated for a minimum of four hours. The resulting pie filling had a satisfactory gel, and its flavor as well as its texture and mouth-feel was good.

In summary, the present invention is seen to provide a different process for preparing a cold-water dispersible, modified tapioca starch as one component which forms a gel when dispersed in cold water.

Now that the preferred embodiments herein have been described in detail, various modifications and improvements thereon will become readily apparent to those skilled in the art. Accordingly, the present spirit and scope are to be limited only by the appended claims, and not by the foregoing specification.

What is claimed is:

1. A cold-water dispersible, modified tapioca starch with gelling properties, prepared by drum-drying a tapioca starch which has been reacted with a crosslinking agent such that the crosslinked starch has a peak Brabender viscosity of from about 250 to about 850 B.U. and reaches peak viscosity from 50° C. in about 22 to 65 minutes, the crosslinked starch being thereafter converted such that the crosslinked, converted starch has a Brabender Viscosity Differential, measured between 80° and 95° C., of from about −40 to about +55% and has a minimum Brabender viscosity at 80° C. of about 100 B.U., said starch after drum drying being capable of forming a gel having a Bloom strength of at least 50 grams.

2. The modified starch of claim 1 wherein said conversion is carried out using acid.

3. The modified starch of claim 1 wherein said crosslinking agent is selected from the group consisting of phosphorus oxychloride, epichlorohydrin, sodium trimetaphosphate and adipic-acetic anhydride.

4. The modified starch of claim 3 wherein said crosslinking agent is phosphorus oxychloride.

5. A process for preparing a cold-water dispersible, modified tapioca starch with gelling properties comprising the steps of:
   a. reacting a tapioca starch with a crosslinking agent such that the crosslinked starch has a peak Brabender viscosity of from about 250 to about 850 B.U. and reaches peak viscosity from 50° C. in about 22 to 65 minutes;
   b. converting the crosslinked starch such that the crosslinked, converted starch has a Brabender Viscosity Differential, measured between 80° and 95° C., of from about −40 to about +55% and has a minimum Brabender viscosity at 80° C. of about 100 B.U.; and
   c. drum-drying the crosslinked, converted starch to obtain said modified starch, said modified starch being defined as capable of forming a gel having a Bloom strength of at least 50 grams.

6. The process of claim 5 wherein said conversion is carried out using acid.

7. The process of claim 5 wherein said crosslinking agent is selected from the group consisting of phosphorus oxychloride, epichlorohydrin, sodium trimetaphosphate and adipic-acetic anhydride.

8. The process of claim 7 wherein said crosslinking agent is phosphorus oxychloride.

9. A food system containing the cold-water dispersible, modified tapioca starch of claim 1.

* * * * *

UNITED STATES PATENT AND TRADEMARK OFFICE
CERTIFICATE OF CORRECTION

PATENT NO. : 4,229,489
DATED : October 21, 1980
INVENTOR(S) : Chung W. Chiu and Morton W. Rutenberg It is certified that error appears in the above-identified patent and that said Letters Patent are hereby corrected as shown below:

In the names of the Inventors on the front page, "Chung W. Chiu" should read -- Chung-Wai Chiu --.

Signed and Sealed this

*Twenty-fourth* Day of *February 1981*

[SEAL]

*Attest:*

RENE D. TEGTMEYER

*Attesting Officer*     *Acting Commissioner of Patents and Trademarks*